United States Patent
Choi et al.

(10) Patent No.: US 12,447,117 B2
(45) Date of Patent: Oct. 21, 2025

(54) COMPOSITION AND METHOD OF ENHANCING SKIN BARRIER USING THE SAME

(71) Applicant: AMOREPACIFIC CORPORATION, Seoul (KR)

(72) Inventors: Eun Jeong Choi, Yongin-si (KR); Hyoung June Kim, Yongin-si (KR); Tae Ryong Lee, Yongin-si (KR); Hyunjung Choi, Yongin-si (KR)

(73) Assignee: AMOREPACIFIC CORPORATION, Seoul (KR)

( * ) Notice: Subject to any disclaimer, the term of this patent is extended or adjusted under 35 U.S.C. 154(b) by 954 days.

(21) Appl. No.: 17/288,109

(22) PCT Filed: Oct. 23, 2019

(86) PCT No.: PCT/KR2019/013920
§ 371 (c)(1),
(2) Date: Apr. 23, 2021

(87) PCT Pub. No.: WO2020/085776
PCT Pub. Date: Apr. 30, 2020

(65) Prior Publication Data
US 2021/0378929 A1  Dec. 9, 2021

(30) Foreign Application Priority Data

Oct. 24, 2018  (KR) .......................... 10-2018-0127637

(51) Int. Cl.
*A61K 8/365* (2006.01)
*A61Q 17/00* (2006.01)
*A61Q 19/00* (2006.01)

(52) U.S. Cl.
CPC .............. *A61K 8/365* (2013.01); *A61Q 17/00* (2013.01); *A61Q 19/004* (2013.01); *A61Q 19/007* (2013.01)

(58) Field of Classification Search
CPC .... A61K 31/202; A61K 9/0053; A61K 8/365; A61Q 19/00; A61Q 17/00; A61Q 19/004; A61Q 19/007; A61Q 17/04
See application file for complete search history.

(56) References Cited

U.S. PATENT DOCUMENTS

| | | |
|---|---|---|
| 2005/0075398 A1 | 4/2005 | Bazan et al. |
| 2011/0190389 A1 | 8/2011 | Arterburn et al. |
| 2014/0079631 A1 | 3/2014 | Serhan et al. |
| 2015/0126602 A1 | 5/2015 | Bannenberg et al. |
| 2015/0165048 A1 | 6/2015 | Mitra et al. |
| 2016/0263019 A1 | 9/2016 | Pernodet et al. |
| 2018/0071190 A1 | 3/2018 | Alberecht et al. |
| 2018/0271818 A1 | 9/2018 | Bannenberg et al. |

FOREIGN PATENT DOCUMENTS

| | | |
|---|---|---|
| CN | 102405039 A | 4/2012 |
| CN | 104684389 A | 6/2015 |
| EP | 4 071 241 A1 | 10/2022 |
| JP | 4-211004 A | 8/1992 |
| JP | 2005-502692 A | 1/2005 |
| JP | 2010-519311 A | 6/2010 |
| JP | 2015-522535 A | 8/2015 |
| JP | 2016-505013 A | 2/2016 |
| JP | 2016-525116 A | 8/2016 |
| JP | 2017-141204 A | 8/2017 |
| JP | 2018-509412 A | 4/2018 |
| JP | 2018-513158 A | 5/2018 |
| KR | 10-2007-0090928 A | 9/2007 |
| KR | 10-2017-0122808 A | 11/2017 |
| KR | 10-2017-0134747 A | 12/2017 |
| KR | 10-2018-0016341 A | 2/2018 |
| KR | 10-2018-0096158 A | 8/2018 |
| KR | 10-1900065 B1 | 9/2018 |
| KR | 10-1900066 B1 | 9/2018 |
| KR | 10-1920617 B1 | 11/2018 |
| KR | 10-2020-0042285 A | 4/2020 |
| KR | 10-2020-0046458 A | 5/2020 |
| WO | 03/053423 A2 | 7/2003 |
| WO | 2006/055965 A2 | 5/2006 |
| WO | 2006/055965 A3 | 5/2006 |

(Continued)

OTHER PUBLICATIONS

Xu, J., et al., Journal of Dermatological Science. 2018, 89(2), pp. 127-135 (Year: 2018).*
Saito, P., et al., Front. Pharmacol., 2018, vol. 9, Article 1242 (Year: 2018).*
Juntao Xu, et al., "Resolvin D1 attenuates imiquimod-induced mice psoriasiform dermatitis through MAPKs and NF-kB pathways", Journal of Dermatological Science, Feb. 2018, pp. 127-135, vol. 89, Issue 2.
S Bang, et al., "17(R)-resolvin D1 specifically inhibits transient receptor potential ion channel vanilloid 3 leading to peripheral antinociception", British Journal of Pharmacology, 2012, pp. 683-692, vol. 165.
Jeremy W. Winkler, et al., "Resolvin D4 stereoassignment and its novel actions in host protection and bacterial clearance", Scientific Reports, 2016, pp. 1-11, vol. 6, document No. 18972.

(Continued)

*Primary Examiner* — Joseph K McKane
*Assistant Examiner* — Quincy McKoy
(74) *Attorney, Agent, or Firm* — Sughrue Mion, PLLC

(57) ABSTRACT

Provided are a composition including a compound of the following chemical formula as an active ingredient, and a method of enhancing a skin barrier by applying it to the skin:

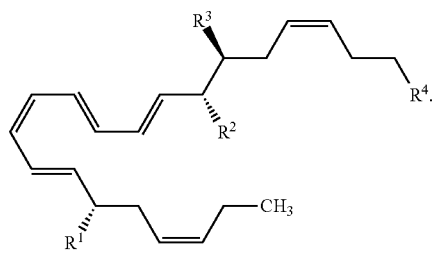

5 Claims, 2 Drawing Sheets

(56) References Cited

FOREIGN PATENT DOCUMENTS

| WO | 2007/061783 | A1 | 3/2007 |
|---|---|---|---|
| WO | 2010/095706 | A1 | 8/2010 |
| WO | 2012/135032 | A2 | 10/2012 |
| WO | 2013/170006 | A2 | 11/2013 |
| WO | 2013/170006 | A3 | 11/2013 |
| WO | 2013/170006 | A4 | 11/2013 |
| WO | 2014/110177 | A2 | 7/2014 |
| WO | 2015/009824 | A1 | 1/2015 |
| WO | 2016/145159 | A1 | 9/2016 |
| WO | 2017/041094 | A1 | 3/2017 |
| WO | 2017/102703 | A1 | 6/2017 |

OTHER PUBLICATIONS

Julia Homann, et al., "In Vivo Availability of Pro-Resolving Lipid Mediators in Oxazolone Induced Dermal Inflammation in the Mouse", PLOS ONE, 2015, pp. 1-20, vol. 10, No. 11.

International Searching Authority, International Search Report for PCT/KR2019/013920 dated Feb. 21, 2020 (PCT/ISA/210).

Menon et al., "Pro-Resolution Potency of Resolvins D1, D2, and E1 on Neutrophil Migration and in Dermal Wound Healing", Nano Life, Mar. 2017, 7(1).

Xu et al., "Resolvin D1 Attenuates Imiquimod-Induced Mice Psoriasiform Dermatitis Through MAPKs and NF-kB Pathways", Journal of Dermatological Science, 2018, 89, 127-135.

Riyesh Menon et al., "Pro-Resolution Potency of Resolvins D1, D2 and E1 on Neutrophil Migration and in Dermal Wound Healing", Nano LIFE, 2017, vol. 7, No. 1, pp. 1750002-1-1750002-10 (10 pages total).

Donald Y.M. Leung et al., "New insights into atopic dermatitis", The Journal of Clinical Investigation, 2004, vol. 113, No. 5, pp. 651-657 (8 pages total).

Communication (Notice To Grant) from Korean Patent Office dated Aug. 23, 2024 in KR Application No. 10-2018-0127637.

Office Action issued Aug. 3, 2023 in U.S. Appl. No. 17/746,555.

Maddodi et al., "Shining light on skin pigmentation: the darker and the brighter side of effects of uv radiation," Photochem Photobiol. Sep. 2012: 88 (5): 1075-1082. (Year: 2012).

Marie Carmel Balcos et al., "Docosahexaenoic acid inhibits melanin synthesis in murine melanoma cells in vitro through increasing tyrosinase degradation", Acta Pharmacologica Sinica, 2014, pp. 489-495, vol. 35.

Office Action issued Apr. 17, 2024 in U.S. Appl. No. 17/285,214.

Office Action issued Jan. 4, 2024 in U.S. Appl. No. 17/285,214.

International Searching Authority, International Search Report of PCT/KR2019/013516 dated Jan. 28, 2020 [PCT/ISA/210].

* cited by examiner

COMPOSITION AND METHOD OF ENHANCING SKIN BARRIER USING THE SAME

CROSS REFERENCE TO RELATED APPLICATION

This application is a National Phase Patent Applications and claims priority of International Application Number PCT/KR2019/013920, filed Oct. 23, 2019 which claims priority to and the benefit of Korean Patent Application No. 10-2018-0127637 filed in the Korean Intellectual Property Office on Oct. 24, 2018, the entire contents of each is incorporated herein by reference.

TECHNICAL FIELD

This disclosure relates to a composition and a method of enhancing a skin barrier by applying it to the skin.

BACKGROUND ART

A skin performs various functions essential for the human body to survive. Barrier functions to maintain homeostasis inside the human body in response to environmental changes, sensory functions to recognize external changes, and body temperature control functions are among the most representative skin functions. Among the various functions of the skin, in particular, the barrier functions of the skin are mainly manifested by the stratum corneum at the outermost portion of the skin. Since the stratum corneum has been reported to affect functions, roles, structures, and the like of an inner living cell layer, that is, an epidermal layer or a dermal layer, as well as performs the simple barrier functions, its importance is constantly increasing. This stratum corneum is composed of dead keratinocytes and intercellular lipids, and plays a key function as a skin protective layer that protects the skin from external stimuli and prevents moisture from evaporating from the inside.

In addition, the keratinocytes in the stratum corneum create a skin barrier through differentiation and keratinization processes.

There are various factors that cause aging in human skin. In particular, ultraviolet (UV) rays cause wrinkles, a decrease in elasticity, pigmentation, and a decrease in a skin moisture content due to damage on the skin barrier. When the skin surface moisture content decreases due to skin damage caused by the ultraviolet rays, the stratum corneum on the skin surface loses flexibility and thus makes the skin dry, eventually failing in properly functioning as a barrier. Therefore, in order to enhance the skin barrier, it is very important to maintain moisturizing power of the skin.

On the other hand, various inflammatory dermatitises are caused by IgE-related immune mechanisms, and there are many reports that a delayed immune response caused by T-cell abnormalities is involved therein. In particular, around a skin area where atopic dermatitis has occurred, invasion of immune-related cells such as macrophages, Th lymphocytes, and mast cells is greatly increased. Patients with atopic dermatitis show a high IgE concentration in the blood, because the number of Th2 cells increases, these Th2 cells secrete Th2 cytokines such as IL-4, IL-13, and the like, which stimulate B lymphocytes, and IgE secretion is stimulated through stimulation of the B lymphocytes. In particular, in case of early atopic dermatitis, IL-4 and IL-13 play an important role (Donald Y. M. Leung et al., J Clin Invest. 2004, 113, 651-657).

In treatment and prevention of inflammation such as the atopic dermatitis, it is very important to make an inflammation-resolving factor actively involved. The inflammation-resolving factor is actively involved in inflammation resolution, and is naturally produced and secreted from immune cells (neutrophil, macrophage) in the tissues at the end of an inflammatory reaction. The inflammation-resolving factor has various forms such as lipids, proteins, and gas molecules, and particularly, an inflammation-resolving lipid factor (specialized pro-resolving lipid mediators, SPMs) among them have been actively studied in recent years. The inflammation-resolving lipid factor is a metabolite produced by metabolism of eicosapentaenoic acid (EPA) or docosahexaenoic acid (DHA), which is an omega-3 polyunsaturated fatty acid (PUFA), in cells. Up to now, there have been many reports on alleviating inflammation responses by the inflammation-resolving lipid factor, but uses of the inflammation-resolving lipid factor for enhancing the skin barrier and improving the moisturizing power have not yet been known. Accordingly, the inventors of one aspect of the present disclosure discovered that the inflammation-resolving lipid factor has these aforementioned effects, while developing a natural skin barrier-enhancing agent, which is safe for the human body.

DISCLOSURE

Technical Problem

An embodiment provides a (cosmetic) composition capable of improving skin moisturizing power by enhancing the damaged skin barrier, particularly the skin barrier damaged by ultraviolet rays.

Technical Solution

According to an embodiment, a composition for enhancing a skin barrier including a compound represented by Chemical Formula 1 as an active ingredient is provided.

[Chemical Formula 1]

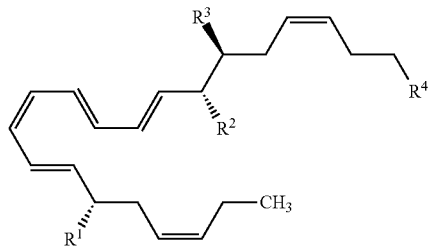

In Chemical Formula 1, $R^1$ to $R^4$ are each independently a hydrogen atom, a hydroxy group, or a carboxyl group, provided that at least one of $R^1$ to $R^4$ is a hydroxy group and at least one of $R^1$ to $R^4$ is a carboxyl group.

$R^1$ to $R^3$ may each independently be a hydroxy group and $R^4$ may be a carboxyl group.

The compound represented by Chemical Formula 1 may be included in a concentration range of 0.01 pM to 100 μM.

The enhancing of the skin barrier may be characterized in that it improves skin moisturizing power by reducing moisture loss of the skin.

The enhancing of the skin barrier may be characterized by enhancing the skin barrier damaged by ultraviolet rays.

The composition may be a cosmetic composition.

According to another embodiment, a method of enhancing a skin barrier includes applying a composition including the compound represented by Chemical Formula 1 as an active ingredient, to the skin.

Advantageous Effects

According to an embodiment, it is possible to enhance the skin barrier by reducing a moisture loss of the skin and improving the skin barrier that is damaged by UV irradiation.

BEST MODE

Figure 1:
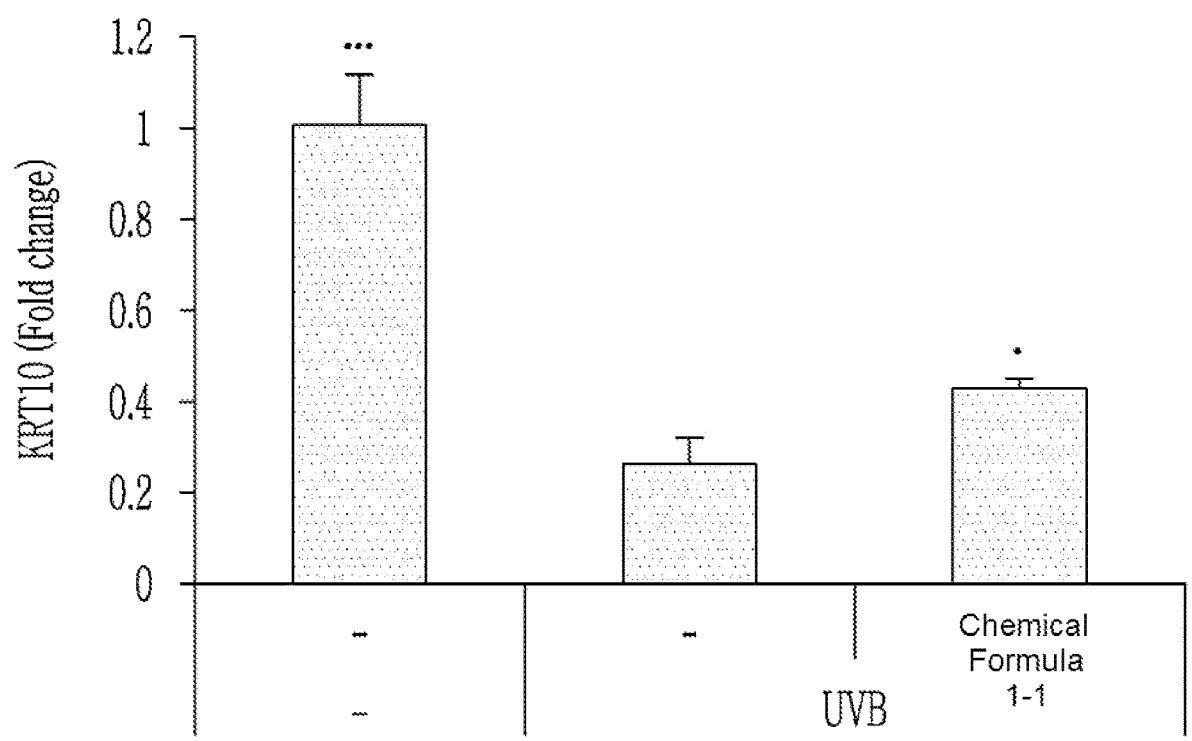
FIG. 1 is a graph measuring an effect on the expression of the keratinocyte differentiation marker gene (Keratin 10).

Hereinafter, embodiments of one aspect of the present disclosure are described in detail so that those of ordinary skill in the art can easily implement one aspect of the present disclosure. However, one aspect of the present disclosure may be embodied in many different forms, and is not to be construed as limited to the example embodiments set forth herein.

In the present specification, improving the skin barrier function means enhancing the barrier of the stratum corneum on the outer shell of the skin. The stratum corneum, a primary barrier of the skin, may be easily damaged by the external environment, and in case of a dry skin, the skin barrier corneum does not properly function or has been damaged. In order to moisturize the dry skin, a moisturizer may be generally applied as a temporary solution but may not be a fundamental solution to the problem, and furthermore, the skin barrier damaged by ultraviolet rays may not be recovered by simply applying the moisturizer. Accordingly, the inventors of one aspect of the present disclosure have confirmed that a compound represented by a specific chemical formula of one aspect of the present disclosure may solve the fundamental problem and enhance the skin barrier, and then completed one aspect of the present disclosure.

In the present specification, it will be understood that when an element such as a layer, film, region, or substrate is referred to as being "on" another element, it may be directly on the other element or intervening elements may also be present. In contrast, when an element is referred to as being "directly on" another element, there are no intervening elements present.

In the present specification, when a definition is not otherwise provided, the term "combination" refers to mixing or copolymerization. In addition, "copolymerization" means block copolymerization or random copolymerization, and "copolymer" means block copolymer or random copolymer.

Hereinafter, a composition for enhancing a skin barrier according to an embodiment is described.

A composition for enhancing a skin barrier according to an embodiment includes a compound represented by Chemical Formula 1 as an active ingredient.

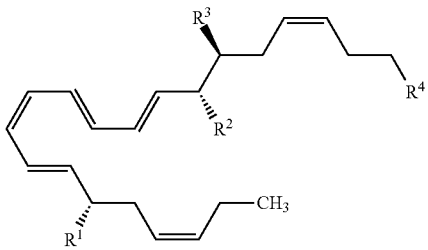

[Chemical Formula 1]

In Chemical Formula 1, $R^1$ to $R^4$ are each independently a hydrogen atom, a hydroxy group, or a carboxyl group, provided that at least one of $R^1$ to $R^4$ is a hydroxy group and at least one of $R^1$ to $R^4$ is a carboxyl group.

For example, in Chemical Formula 1, $R^1$ to $R^3$ may each independently be a hydroxy group and $R^4$ may be a carboxyl group.

The compound represented by Chemical Formula 1 is one of the inflammation-resolving lipid factors (specialized pro-resolving lipid mediators, SPMs), which enhance damage of the skin barrier by ultraviolet rays and reduces moisture loss of the skin, thereby improving the moisturizing power of the skin. Specifically, when closely looking at the skin damaged by ultraviolet rays, an expression decrease of keratinocyte differentiation marker genes and desmosome factor genes in the skin is found, but the compound represented by Chemical Formula 1 may have an excellent effect in improving the skin barrier damaged by the ultraviolet rays by increasing the expression of the keratinocyte differentiation marker genes and the desmosome factor genes. In other words, the composition according to an embodiment includes the compound represented by Chemical Formula 1 as an active ingredient, and thus may have an excellent effect of enhancing the skin barrier damaged by the ultraviolet rays.

In other words, the composition according to an embodiment includes the compound represented by Chemical Formula 1 as an active ingredient, and thus may reduce the moisture loss of the skin and have an excellent effect in improving skin moisturizing power.

An embodiment provides a composition for enhancing a skin barrier including the compound represented by Chemical Formula 1 as an active ingredient, wherein the compound may include a pharmaceutically effective amount of the compound represented by Chemical Formula 1 alone or at least one pharmaceutically acceptable carrier, excipient, or diluent.

In the composition, the compound represented by Chemical Formula 1 may be included in a concentration range of 0.01 pM to 100 μM. When the compound represented by Chemical Formula 1 is used as a cosmetic composition for enhancing a skin barrier, the compound represented by Chemical Formula 1 may be used at a concentration of greater than or equal to 0.01 pM, greater than or equal to 0.1 pM. The compound represented by Chemical Formula 1 may be used at a concentration of less than or equal to 100 μM, less than or equal to 10 μM. When the compound represented by Chemical Formula 1 is used at a concentration of less than 0.01 pM, the expression of the keratinocyte differentiation marker genes is insignificant, not obtaining the effect of enhancing the skin barrier function, but when the compound represented by Chemical Formula 1 is used at a concentration of greater than 100 μM, cytotoxicity harming the human body appears, which is not desirable.

In the above, "pharmaceutically effective amount" refers to an amount sufficient to allow the physiologically active ingredient to be administered to an animal or human to exhibit desired physiological or pharmacological activity. However, the effective amount of the pharmaceutical may vary according to the degrees of symptoms, ages, weights, health status, sexes, administration routes, and duration of treatment.

In addition, "pharmaceutically acceptable" refers to physiologically acceptable when administered to humans, and usually does not cause allergic reactions or similar reactions, such as gastrointestinal disorders or dizziness. Examples of the carrier, excipient, and diluent may include lactose, dextrose, sucrose, sorbitol, mannitol, xylitol, erythritol, maltitol, starch, acacia rubber, alginate, gelatin, calcium phosphate, calcium silicate, cellulose, methyl cellulose, polyvinylpyrrolidone, water, methylhydroxybenzoate, propylhydroxybenzoate, talc, magnesium stearate, and mineral oils. In addition, it may further include fillers, anticoagulants, lubricants, wetting agents, fragrances, emulsifiers, and antiseptics.

For example, the composition may be a cosmetic composition.

In the present specification "cosmetic" may refer to any material that may have a medical function in addition to the cosmetic function.

The formulation of the cosmetic composition is not particularly limited and may be appropriately selected as desired.

For example, the cosmetic composition may be formulated into formulations such as solutions, suspension liquids, emulsions, pastes, gels, creams, lotions, powders, soaps, surfactant-containing cleansings, oils, powder foundations, emulsion foundations, wax foundations, and sprays, but is not limited thereto. More specifically, it may be formulated into cosmetic compositions such as detergents, tonics, hair dressings, nourishing lotions, essences, serums, treatments, conditioners, shampoos, lotions, wools, hair dyes, and the like, and may be formulated into basic cosmetics such as an oil-in-water (O/W) type, a water-in-oil (W/O), and the like. For example, the composition may have a formulation selected from a skin lotion, a skin toner, an astringent, lotion, a milk lotion, a moisture lotion, a nutrition lotion, a massage cream, a nutrition cream, a moisture cream, a hand cream, an ointment, a foundation, an essence, a nutrition essence, a pack, a soap, a cleansing foam, a cleansing lotion, a cleansing cream, a body lotion, a body cleanser, a lotion, an ointment, a gel, a cream, a patch, and a spray. In addition, in the composition, in addition to the above-mentioned essential components in each formulation, other components may be appropriately selected and formulated without difficulty by a person of ordinary skill in the art according to types or use purposes of other external preparations. For example, ultraviolet blocking agents, hair conditioning agents, fragrances, and the like may be further included.

The cosmetic composition may include a cosmetically acceptable medium or base. These are all formulations suitable for topical applications. The cosmetic composition may be provided in the form of emulsions obtained by dispersing an oil phase in an aqueous phase, suspensions, microemulsions, microcapsules, microgranules, or ion-type (liposome) and/or non-ionized vesicle dispersing agents, or in the form of creams, skins, lotions, powders, ointments, sprays, or conceal sticks. These compositions may be prepared according to conventional methods in the art.

When the formulation of one aspect of the present disclosure is a solution or emulsion, a solvent, a solubilizer, or an emulsifier may be used as carrier components. For example, water, ethanol, isopropanol, ethyl carbonate, ethyl acetate, benzyl alcohol, benzyl benzoate, propylene glycol, 1,3-butylglycol oil, glycerol aliphatic ester, polyethylene glycol, or fatty acid ester of sorbitan may be used.

If the formulation of one aspect of the present disclosure is a suspension, the carrier component may be a diluent of a liquid such as water, ethanol, or propylene glycol, a suspending agent such as ethoxylated isostearyl alcohol, polyoxyethylene sorbitol ester, and polyoxyethylene sorbitan ester, microcrystalline cellulose, aluminum metahydroxide, bentonite, agar, tragacanth, and the like.

If the formulation of one aspect of the present disclosure is pastes, creams, or gels, the carrier component may be animal oil, vegetable oil, wax, paraffin, starch, tragacanth, cellulose derivatives, polyethylene glycol, silicone, bentonite, silica, talc, or zinc oxide.

If the formulation of one aspect of the present disclosure is powders or sprays, the carrier component may be lactose, talc, silica, aluminum hydroxide, calcium silicate, or polyamide powders. Particularly, in the case of sprays, a propellant such as a chlorofluorohydrocarbon, propane/butane, or dimethyl ether may be additionally included.

In an embodiment of one aspect of the present disclosure, the cosmetic composition may include thickeners. The thickeners included in the cosmetic composition of one aspect of the present disclosure may be methyl cellulose, carboxyl methyl cellulose, carboxyl methyl hydroxy guanine, hydroxy methyl cellulose, hydroxyethyl cellulose, a carboxyl vinyl polymer, polyquaternium, cetearyl alcohol, stearic acid, and carrageenan, preferably one or more of carboxyl methyl cellulose, a carboxyl vinyl polymer, and polyquaternium may be used, and more preferably a carboxyl vinyl polymer may be used.

In an embodiment of one aspect of the present disclosure, the cosmetic composition may include a variety of suitable bases and additives as needed, and the types and amounts of these components may be easily selected by the inventor. If necessary, it may include an acceptable additive, and may further include, for example, conventional ingredients such as antiseptics, pigments, additives, and the like.

The antiseptics may specifically be phenoxyethanol or 1,2-hexanediol, and the fragrances may be artificial fragrances.

In an embodiment of one aspect of the present disclosure, the cosmetic composition may include a composition selected from a water-soluble vitamin, an oil-soluble vitamin, a polymeric peptide, a polymeric polysaccharide, a sphingolipid, and a seaweed extract. Other ingredients that may be added include fats and oils, humectants, emollients, surfactants, organic and inorganic pigments, organic powders, ultraviolet absorbers, antiseptics, fungicides, antioxidants, plant extracts, pH adjusters, alcohols, pigments, fragrances, blood circulation accelerators, coolants, anhidrotics, purified water, and the like.

In addition, the compounding components which may be added other than these are not limited thereto. Moreover, any component may be blended in the range which does not damage the purpose and effect of the invention.

Furthermore, the cosmetic composition according to an embodiment may be used not only as a pharmaceutical composition as described above, but also as a dietary supplement. For example, it may be easily used as main ingredients, auxiliary ingredients, food ingredients, food additives, functional foods, or beverages.

The "food" means a natural or processed product including one or more nutrients, and preferably means that it is ready to be eaten directly after a certain amount of processing. It includes all foods, food additives, functional foods, and beverages.

The foods to which the food composition can be added may include, for example, various foods, beverages, gums, teas, vitamin composites, and functional foods. In addition, the foods may include special nutritional products (e.g., formulas, baby food, etc.), processed meat products, fish products, tofu, jellies, noodles (e.g. ramen noodles, etc.), breads, dietary supplements, seasoned foods (e.g., soy sauce, soybean paste, red pepper paste, mixed soy sauce, etc.), sauces, sweets (e.g. snacks), candy, chocolate, gum, ice cream, dairy products (e.g. fermented milk, cheese, etc.), other processed foods, kimchi, pickles (various kimchi, pickles, etc.), beverages (e.g., fruit beverages, vegetable beverages, soy milk, fermented beverages, etc.), and natural seasonings (e.g., ramen soup, etc.), but are not limited thereto. The foods, beverages, or food additives may be prepared by conventional manufacturing methods.

In addition, "functional foods" or "health functional foods" refers to a food group that has added values to foods by using physical, biochemical, or biotechnological techniques to act and express functions of foods for specific purposes, or foods that are processed and designed to fully express the body's regulatory functions, such as defense rhythm control of food compositions, disease prevention, and recovery of living bodies. It may specifically be a health functional food. The functional food may include acceptable food auxiliary additives, and may further include suitable carriers, excipients, and diluents commonly used in the manufacture of functional foods.

The types of dietary supplements are not limited thereto, but may be in a form of powders, granules, tablets, capsules, or beverages.

According to another embodiment, a method of enhancing a skin barrier includes applying a composition including the compound represented by Chemical Formula 1 as an active ingredient, to the skin.

Advantages and features of one aspect of the present disclosure and methods for achieving them will be apparent with reference to the examples described in detail below. One aspect of the present disclosure is described in detail with reference to examples. However, these examples are specifically provided for describing one aspect of the present disclosure, and the range of one aspect of the present disclosure is not limited to these examples.

MODE FOR INVENTION

Examples

Experimental Example: Confirmation of Expression Level of Keratinocyte Differentiation Marker (KRT10) and Desmosome Constituent Factor (DSC1)

Figure 2:
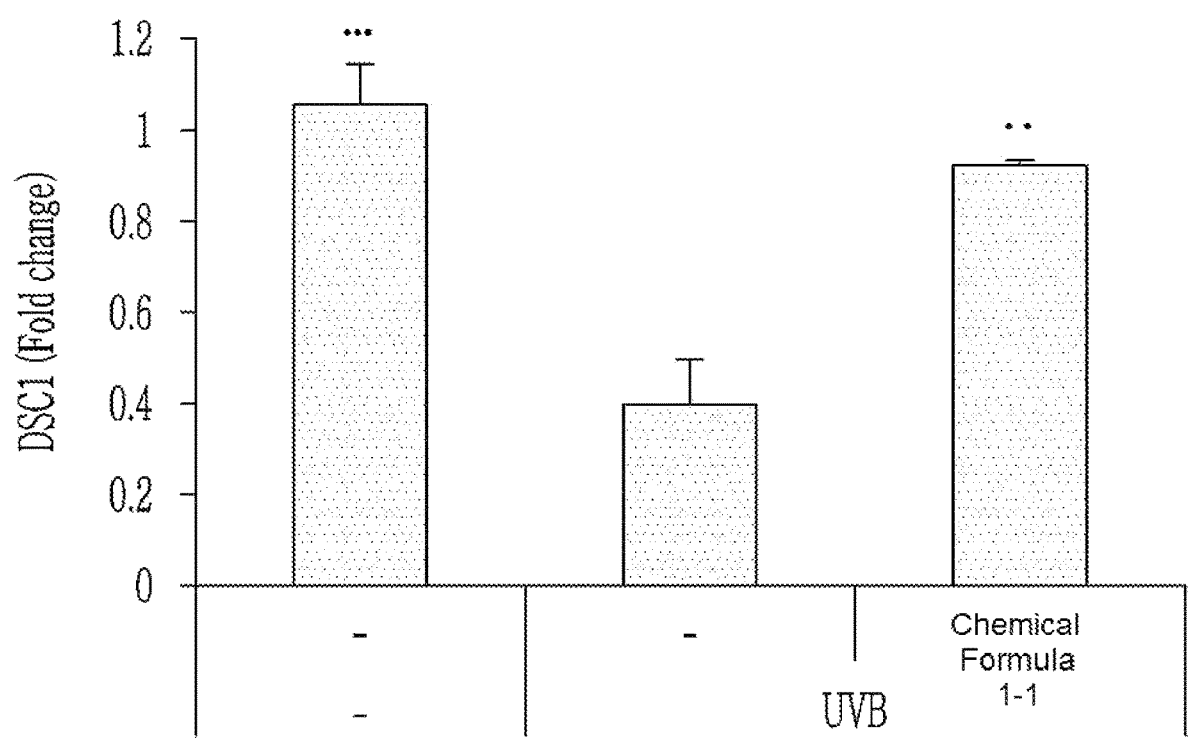
FIG. 2 is a graph measuring an effect on the expression of the DSC1 (Desmocollin-1) gene, which is an intercellular conjugate (desmosome) constituent factor.

Normal human epidermal keratinocytes (NHEK) were cultured in a 6-well plate incubator. 24 hours later, the normal human epidermal keratinocytes (NHEK) were cultured by replacing it with phosphate-buffered saline (PBS) and irradiating it with UVB (25 mJ/cm$^2$) and adding 10 nM of a compound represented by Chemical Formula 1-1 (Cayman Chemical) to the NHEK culture medium. On the fourth day of the culture, cells were harvested to separate RNA and synthesize cDNA through RT-PCR (a reverse transcriptional polymerase chain reaction), and the synthesized cDNA was used to perform TAQMAN™ real-time PCR and measure gene expression levels of a keratinocyte differentiation marker, KRT10, and a desmosome constituent factor, DSC1, and the results are shown in FIGS. 1 and 2. Referring to FIGS. 1 and 2, the gene expression levels of KRT10 (keratin 10) and DSC1 decreased after the ultraviolet irradiation, but the gene expression levels of KRT10 (keratin 10) and DSC1 increased again after treated with the compound represented by Chemical Formula 1-1, and accordingly, the compound represented by Chemical Formula 1-1 improved a skin barrier damaged by the ultraviolet rays.

[Chemical Formula 1-1]

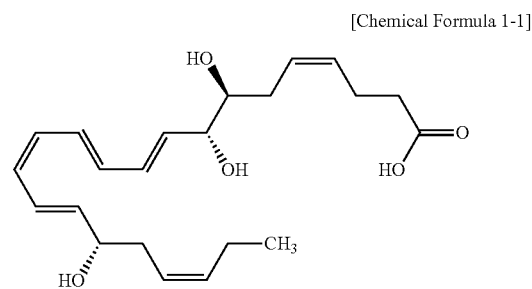 [SMILES: CC/C=C\C[C@H](O)/C=C/C=C\C=C\C=C\[C@@H](O)[C@@H](O)C/C=C\CCC(=O)O]

Although the preferred embodiments of one aspect of the present disclosure have been described in detail, the scope of one aspect of the present disclosure is not limited thereto, and various modifications and improvements by those skilled in the art using the basic concept of one aspect of the present disclosure defined in the following claims are also within the scope of the invention.

The invention claimed is:

1. A method of enhancing a skin barrier in a subject, comprising applying an effective amount of a composition topically to skin of the subject,
   wherein, the composition comprises a compound of Chemical Formula 1 as an active ingredient:

Chemical Formula 1

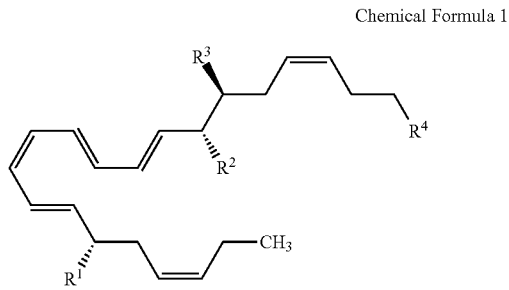

wherein, in Chemical Formula 1,
   $R^1$ to $R^4$ are each independently a hydrogen atom, a hydroxy group, or a carboxyl group, provided that at least one of $R^1$ to $R^4$ is a hydroxy group and at least one of $R^1$ to $R^4$ is a carboxyl group,
wherein the skin of the subject has skin barrier damage caused by ultraviolet rays,
wherein the damaged skin barrier of the subject has a decreased expression of KRT10 (keratin 10) gene and DSC1 (desmocollin-1) gene compared to skin that has not been exposed to UVB and the application of the composition increases the expression of KRT10 gene and DSC1 gene, and wherein the compound of Chemical Formula 1 is included in a concentration range of 0.01 pM to 10 nM.

2. The method of claim 1, wherein
R$^1$ to R$^3$ are each independently a hydroxy group, and
R$^4$ is a carboxyl group.

3. The method of claim 1, wherein the composition improves skin moisturization by reducing moisture loss of the skin.

4. The method of claim 1, wherein the composition is a cosmetic composition.

5. The method of claim 1, wherein the compound of Chemical Formula 1 is included in a concentration of 10 nM.

\* \* \* \* \*